(12) United States Patent
Smeets et al.

(10) Patent No.: US 7,108,624 B2
(45) Date of Patent: Sep. 19, 2006

(54) BELT

(75) Inventors: Paulus Maria Smeets, Tilburg (NL); Gerardus Petrus Maria Van Dijnsen, Eindhoven (NL); Jeroen Herman Van Liempd, Bavel (NL)

(73) Assignee: Van Doorne's Transmissie B.V., Tilburg (NL)

( * ) Notice: Subject to any disclaimer, the term of this patent is extended or adjusted under 35 U.S.C. 154(b) by 139 days.

(21) Appl. No.: 10/451,984

(22) PCT Filed: Dec. 28, 2000

(86) PCT No.: PCT/EP00/13376

§ 371 (c)(1),
(2), (4) Date: Nov. 18, 2003

(87) PCT Pub. No.: WO02/053936

PCT Pub. Date: Jul. 11, 2002

(65) Prior Publication Data

US 2004/0082417 A1   Apr. 29, 2004

(51) Int. Cl.
*F16G 5/16* (2006.01)

(52) U.S. Cl. ...................................... 474/201

(58) Field of Classification Search ............... 474/201, 474/242, 240, 244, 272, 246, 265, 270
See application file for complete search history.

(56) References Cited

U.S. PATENT DOCUMENTS

| 3,720,113 | A | | 3/1973 | Van Doore et al. |
| 4,299,586 | A | * | 11/1981 | Van der Hardt Aberson ............. 474/201 |
| 5,123,880 | A | | 6/1992 | Sekine et al. |
| 6,679,798 | B1 | * | 1/2004 | Takagi et al. .............. 474/242 |
| 6,705,963 | B1 | * | 3/2004 | Smeets et al. .............. 474/242 |
| 2004/0053723 | A1 | * | 3/2004 | Smeets .................... 474/242 |

FOREIGN PATENT DOCUMENTS

| EP | 0 000 802 | 2/1979 |
| EP | 0 073 962 | 3/1983 |
| EP | 0 095 257 | 11/1983 |
| EP | 0 122 064 | 10/1984 |
| EP | 0 135 237 | 3/1985 |
| EP | 0 976 949 | 2/2000 |
| GB | 655 173 | 7/1951 |
| WO | WO 99 53218 | 10/1999 |
| WO | WO 00 28237 | 5/2000 |

OTHER PUBLICATIONS

Patent Abstracts of Japan, vol. 2000, No. 06, Sep. 22, 2000 & JP 2000 074150 A (Honda Motor Co LTD), Mar. 7, 2000 abstract.

(Continued)

*Primary Examiner*—Vicky A. Johnson
(74) *Attorney, Agent, or Firm*—Young & Thompson

(57) ABSTRACT

Belt for use in a continuous variable transmission, comprising an endless carrier for taking op tensile forces, and a plurality of transverse elements moveable in the longitudinal direction along the carrier. The elements are provided with at least one saddle surface for contacting the carrier. The saddle surface defines an ultimate mutual position of the carrier and the elements relative to each other within the belt in radial direction, with a tapered lower element part including a rocking edge and an upper part extending radially beyond the carrier, when the carrier and surface are in mutual contact. Each axial end of the surface is adjoined by a limb extending predominantly in radial outward direction, thereby defining a recess open to the radial outer end of the element allowing free insertion of the carrier in the recess.

20 Claims, 5 Drawing Sheets

OTHER PUBLICATIONS

Patent Abstracts of Japan, vol. 013, No. 310 (M-850), Jul. 14, 1989 & JP 01 098733 A (NHK Spring Co LTD), Apr. 17, 1989 cited in the application abstract.

Patent Abstracts of Japan vol. 2000, No. 11, Jan. 3, 2001 & JP 2000 213609 A (Nissan Motor Co LTD), Aug. 2, 2000 cited in the application abstract.

* cited by examiner

A—A

B—B

BELT

BACKGROUND OF THE INVENTION

The present invention relates to a belt for a continuously variable transmission,

DESCRIPTION OF THE RELATED ART

Such a belt, generally known as a "push belt" and in this particular design alternatively denoted single package push belt, is generally known from a plurality of publications. One early publication of a so-called single package belt is U.S. Pat. No. 3,720,113. The single package push belt is highly desired for practical application compared to a double package belt as known from later publications like EP-A 0000802, but suffers from costly technical measures at providing separate retaining means to keep the carrier and transverse elements of the belt as a whole, in other words to prevent the elements from falling apart from the carrier and to maintain its structural coherence. This maintaining of the integrity of the belt particularly is an issue while the belt is in operation, but is also a consideration at simply maintaining the integrity of a belt assembly.

The prior art shows several ways of solving the above-mentioned problem. In particular, several types of carrier receiving recesses of the transverse element are shown. Amongst the se are the provision of one or more axially extending slots, the provision of element parts for hooking the carrier, and the provision of retaining means for locking the carrier receiving recess means such as closure pins.

In the belt disclosed by the said US publication, radially extending limb parts of the element are bent axially inwardly with respect to the recess, thereby creating a hook like part, so that the carrier, in addition to it being surrounded along its lateral and its radial inner sides, is at least partly surrounded along its radial outer side too. This construction of hooking of the carrier by the transverse element, is favourable for it's relatively low weight. However, the construction suffers from manufacturing difficulties in that the inward bending of the transverse element provides for a relatively complicated blanking shape and in that at assembly specific effort is required to insert the carrier in the desired position relative to the transverse elements. In particular, the carrier can not be inserted freely, i.e. without deformation thereof. Such deformation may be an initiator of carrier breakage when under severe tensile load during operation. Another construction of such kind is disclosed in EP-A 0095257, where the carrier is relatively tightly hooked into a contacting position with the element.

A construction, which overcomes the latter insertion problem, is known from EP-A 0135237. In this known construction an element shows a so-called slot, being a laterally oriented recess in the element having an opening towards an upper corner of the element. At least part of the radial outer side of the carrier is contacted by a radial outer, or upper element part, and the elements are to be inserted in an alternating sequence. Belts comprising such elements come with a relatively high weight, thus limiting the performance in terms of transmittable torque. Also the alternating sequence requirement brings along a manufacturing complication in that the elements have to be assembled into the belt alternatingly positioned, i.e. mirrored about the longitudinal direction of the belt.

An alike earlier construction showing a favourably more simple slot construction is known from EP-A 0073962. This document discloses elements with a more or less straight slot having an opening towards an axial side of the element. For preventing the risk of the carrier coming into contact with a pulley face while the belt is in operation, also with this construction the elements have to be fitted mirrored. The complication of mirrored adjacent elements is suggested to be overcome by producing the lower, tapered element part with a two sided tapering so that, expectedly at the expense of some production difficulty and cost, only one element orientation need be applied.

Another known single package design shows a separate element type for maintaining belt integrity at operation of the belt. Such element type is provided with a retaining means in the from of a locking means, e.g. a pin or a locking ring, closing of the carrier receiving recess after assembly thereof. Such a construction may render a secured integrity of the belt, both in operation and as a separate part, but is relatively unfavourable due to weight and manufacturing cost, while the robustness in many designs can not be guaranteed when somewhat larger torque levels are to be transmitted, such as e.g. typically required for automotive application. Of this belt design, one such pin construction is disclosed in EP-A 0122064, and one such ring construction is disclosed in U.S. Pat. No. 5,123,880.

BACKGROUND OF THE INVENTION

The present invention principally, but not exclusively, aims at realising a single package belt design without above mentioned cost raising disadvantages, which is composed of only a single element type, which has a relatively uncomplicated shape and a relatively low weight so as to maximise the amount of torque transmittable by the belt.

In this design the limbs are released of a hooking function, i.e. released from a function in aiding the elements to exit a pulley. In the known belt design this function implicate, taken in longitudinal view, an axial outward moment acting at the base, i.e. radially innermost part of a limb, which thus is required to be relatively broad. Presumably to reduce the weight of the element, in the known design the limbs have been cut off in axial width toward their radial outer end. In the current invention, in the absence of such function the limbs may be made of substantial less axial width, allowing the m to extend fully radially beyond the carrier. This is realised by allowing a free, i.e. unforced mutual insertion of element and carrier. Surprisingly departing from the underlying insight according to the invention that at an in between pulleys trajectory the belt may be trusted to assume an at least slightly radially inwardly curved shape by mutual contacting of the radial outer portions of the elements, whereby exiting of the pulley is effect by the elements mutually contacting.

A major advantage in the current design, apart from ease of assembly, is realised in that the power transmitting capacity is optimised by the reduction on overall limb width, particularly in relation to the nominal element width, implying the width of the element at the rocking edge, which is generally proportional to an axial width of the carrier. The measure according to the invention allows the saddle surface to be relatively increased, which is favourable since thereby the width of the carrier may be increased and accordingly its thickness reduced. This is particularly advantageous when the carrier is composed of a set of radially stacked endless rings. It being recognised by the invention that radial outer rings of such set tends to contribute less to the power transmitting capacity than the radial inner rings. A reduction in number of rings may then be favoured over a small increase in the axial width of the carrier. Moreover, the number of rings also has a large influence on cost. Particularly, in this respect, the width of the individual limbs at a level at or near the saddle surface is set at less than one-twelfth the axial width of said surface.

In a further development of the invention, the limbs are directed at least for a predominant part radially under an angle at least substantially conforming to the angle at which lateral side faces, or pulley contact faces, of the elements for contacting the sheaves of a pulley are oriented, i.e. so-called flank angle cone angle. In this manner an axially wide mutual-contacting basis is realised for the elements, promoting the stability of the belt current design. Such is particularly desired in view of a lack of mutual hooking function of elements and carrier.

In yet a further development of the invention, the limbs of the elements may be provided with a hooking portion as known per se. However, according to the invention it is provided at considerably beyond the carrier when in contact with the element, such that it may be introduced by mutual rotation about the longitudinal direction of the belt. By this measure a stable mutual contacting of the element's upper parts, both in a pushing and in a slack in between pulleys trajectory is realised, enhancing both a secure operation of the belt, and the torque transmitting capacity thereof. Again this support the limb design according to the invention having a small axial width favouring the axial width of the saddle surface. The measure according to the invention of realising a large width of the limb at some radial distance from the carrier favours good mutual contact of the elements upper parts. With such a design, most secure with the longitudinal play between the elements of the belt reduced to a minimum in conformance with the common practice in the known belts, the belt operates in a manner wherein mutual contacting of the element upper parts prevent the belt from disintegrating.

The present invention further aims at principally realising a single package belt design without above mentioned cost raising disadvantages, which is composed of the least possible number of element types, which has a relatively uncomplicated shape and a relatively low weight so as to maximise an amount of torque transmittable by the belt, while still responding in a good manner to the various functional demands for a belt. Such a belt is according to the invention realised by the feature of the limbs extending radially beyond the carrier, defining a recess open to the radial outer side of the element, allowing a free mutual insertion between the element and the carrier.

A belt comprising such features may be produced easily since no additional part is required as a retaining means. Surprisingly in the design according to the invention, the retaining means is achieved by favourably utilising and adapting some geometric features inherently present within a belt, being the adaptation of the ratio between a belt's total longitudinal play between its elements and the radial belt height above the rocking edge. The solution is based on the insight that at a slack in between pulleys portion of the belt, the most critical part in view of disintegration of the belt, the elements may block one another in a stable end position in which the relevant belt part is curved at least slightly concave. The solution takes account of the experience and insight that such slack part tends to buckle radial inward due to the clamping action at the pulley where the belt exits, which makes the belt, at least the elements thereof to tend to continue to rotate with the same pulley.

With the solution according to the invention favourably large values of longitudinal play between adjacent pairs of element within the belt may be allowed thus favouring the assembly of the belt when the element height above the rocking edge is made sufficiently large. The invention hereby may take advantage of the experience that only part of the said is present in the slack trajectory part, while moreover the portion of that play actually present in this slack trajectory tends to be distributed between pairs of adjacent elements.

Alternatively to the preceding solution, the described problem of maintaining the integrity of a so called single package belt is according to the invention solved by a feature which is here incorporated in addition to the preceding solution. In this feature, at least the majority of the transverse elements have a upper element part of which a radial outer end portion has a greater thickness than that of the said rocking edge, such that an array of elements pushed against one another with in said belt by mutually contacting with said end portions, assumes a stable arc-like shape. In this manner, at least at a pushing in between pulley's trajectory a so called cat's back-like. arc is achieved in the pushing part of a belt as arranged between two pulleys. Thus exiting of a belt from a pulley is enhanced, while the elements do not fall apart from each other or from the carrier since they are wedged in their position when observed, from side elevation. With the addition, or presence as the case may be, of such feature, the belt may at stand still of a transmission be incorporated without the presence of a pre-tensioning spring in a pulley, since the wedging feature prevents the elements located at a transmissions upper side with respect to the earth's gravity from assuming a position from which the belt may no longer deform to a desired rod like condition. In a slack trajectory part either at the transmissions upper or lower side, the wedging feature aids in assuming a stable inwardly curved end position of the slack trajectory.

Surprisingly the measure according to the latter aspect of invention again realises the integrity of the belt while obviating to application of the previously described known means for maintaining the integrity of the belt by positively or directly limiting the relative radial movement between the transverse element and the carrier. This provides for the possibility of applying a recess entirely open in radial direction, i.e. with even leaving away hook or locking parts. For achieving this effect, according to the invention only a small but noticeable amount of tapering of the upper element part is required. In this way favourable advantage is taken of the circumstance that a belt incorporates a significantly large number of transverse elements.

It is here remarked that in the context of the current description the height of the element is assumed to concur with the dimension of the belt in the radial direction when positioned in a circular shape, the width of the element concurs with the dimension of the belt in the transverse or axial direction and the thickness of the element concurs to its dimension in the belt's longitudinal direction, i.e. along the circumference of the belt.

The above proposed embodiments and aspects of the invention, either per se or in combination most favourably operate in combination with a carrier composed of a set of radially nested endless flat metal bands that are relatively thin.

BRIEF DESCRIPTION OF THE DRAWINGS

With the above and other objects in view, which will become apparent from the detailed description below, preferred embodiments of flexible belt type transmission means according to the invention are shown in the accompanying drawings, in which.

DESCRIPTION OF THE PREFERRED EMBODIMENTS

Figure 1:
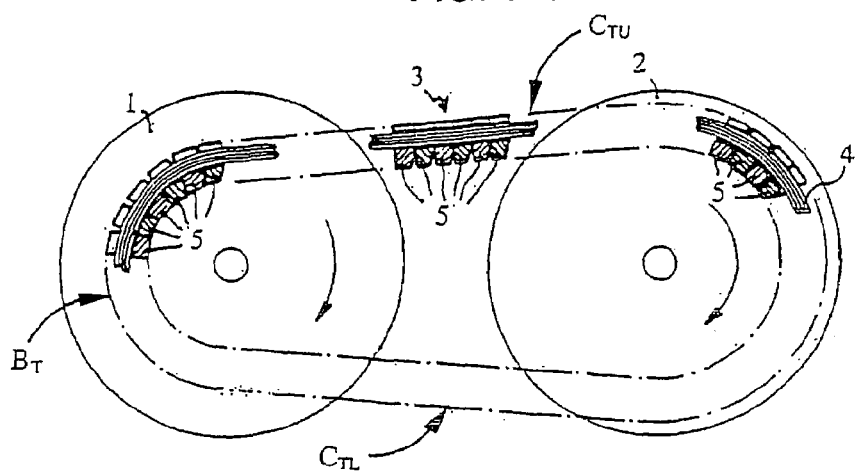
FIG. 1 is a diagrammatic elevation in section of a belt type transmission means known per se.

In the drawings structural portions performing corresponding functions are referred to by same reference numbers. The figures are described more in detail in the following.

FIG. 1 schematically shows a belt type transmission means, also denoted a continuously variable transmission (CVT), adapted to automotive application, but suitable for other applications like e.g. windmills, with a belt 3, running between pulleys 1 and 2 while resting against sheaves thereof. The sheaves of a pulley 1, 2 define a V-shaped groove for receiving generally V-shaped pulley contact faces 15 and 16, also denoted flank 15 and 16 of the belt 3. The belt 3 conveys a force from one pulley 1, 2 to the other, which force emanates from a torque loaded onto such one pulley 1, 2 e.g. by an engine or a vehicle. The belt 3 is depicted in a position near a so-called LOW position, comparable to the first gear position in manual transmissions. The belt 3, alternatively denoted push belt 3, comprises a carrier 4, alternatively denoted support 4 or tensile means 4, in the form of a set of nested endless thin metal bands 7, otherwise denoted rings 7, and a multitude of separate transverse elements 5, otherwise denoted blocks 5. The elements 5 are arranged freely slidably along said carrier 4 in an endless, virtually continuous array, thus guaranteeing the belt 3 to be able to function as a so called push belt 3, i.e. a belt 3 for transmitting force from one pulley to the other at least partly via a pushing force within the array of transverse elements 5 pushing adjacent elements 5 against one another between the two pulleys 1 and 2.

For operational application the belt 3 may run between the sheaves at any radial distance from a pulley's shaft, thus creating a steplessly variable transmission ratio. For clamping the belt 3 between the sheaves and for varying the running radius of the belt 3, at least one sheave of each respective pulley 1, 2 is provided axially displaceable in a manner known per se, e.g. by hydraulic control means applying a force on the said at least one sheave, sufficient for transmitting the said torque or for shifting the running radius of the belt 3 in the respective pulley 1, 2.

As illustrated in the figures, the elements 5 of a belt 3 are provided with inclined pulley contact faces 15 and 16, alternatively denoted flanks 15 and 16 for contacting the sheaves of said the pulleys 1 and 2. When clamped sufficiently strong between the sheaves of a pulley 1, 2, the belt 3 is capable of transmitting force from one rotating pulley 1, 2 to the other after such force has been transmitted to the belt 3 by way of friction between said flanks 15 and 16 and V-faces of the respective sheaves. The V-shaped groove defined by the sheaves of the pulleys 1 and 2 has a V-angle that at least virtually matches the angle at which the inclined flanks 15 and 16 of the element 5 are oriented, the so called flank angle. The flanks 15 and 16 may be roughened by the provision of rills and grooves, so as to allow adequate presence of a cooling medium such as transmission oil, in the contact between element 5 and pulley 1, 2. The elements 5, as seen in cross section preferably have a lower element part, which includes parts of the element 5 located radially inward from the level of a rocking edge 9 and the rocking edge 9 itself. An upper element part the n is defined as parts of the element 5 located radially outward, i.e. above the rocking edge 9. The rocking edge 9 is alternatively denoted a tilting zone 9 and comprises a curvature in radial direction that commonly has a radius of around 6 to 12 mm and holds a theoretical multiplicity of axially oriented contact lines along which the elements 5 may mutually contact and rock, e.g. while in an arc-like bent trajectory $B_T$ between the sheaves of a pulley 1, 2.

Figure 3:
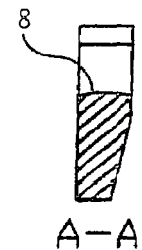
FIG. 3 depicts section A—A in FIG. 2.

At least an inclined face 19 of the lower element part, i.e. a side face in the elevation of FIG. 3, is inclined relative to the upper element part at the same side of the element 5, so that the element 5 becomes thinner towards it's radial inner side, i.e. the side directed to the inner side of the belt 3. The elements 5 further are provided with generally slightly convex shaped and radially outward facing carrier contact face 8. The carrier contact face 8, alternatively denoted saddle 8, is intended for contacting the carrier 4 during operation of the belt 3, in particular the radially innermost band thereof. Such saddle surface 8 is generally also shaped convex as seen in side elevation at least for a part thereof intended to contact the carrier 4.

In operation parts of the belt 3, through the rotation of a driving pulley passes a so called crossing trajectory $C_{TU}$, $C_{TL}$ alternatively denoted an "in-between pulleys trajectory parts" $C_{TU}$, $C_{TL}$ between the bent trajectories $B_T$ where the belt elements 5 are clamped in the respective pulley 1, 2 in which crossing trajectory it shows an upper and a lower part, crossing trajectory $C_{TU}$ and crossing trajectory $C_{TL}$ respectively, of predominant stretched nature. Where clamped between the sheaves of the pulleys 1 and 2 the belt 3 shows a first and a second typically arc-like bent trajectory $B_T$. At the two in-between pulleys trajectory parts $C_{TU}$, $C_{TL}$, the belt 3 is at one part, the push trajectory part, tensioned, i.e. elements 5 are stiffly pushed against one another. In such part the belt 3 performs a pushing function. At the opposite in-between pulleys trajectory part $C_{TU}$, $C_{TL}$, the slack trajectory part, the belt 3 is somewhat slackened, i.e. adjacent elements 5 may show some play, i.e. a part of the total play between the elements 5 of a belt 3 required for inserting a final element 5 at assembly, resulting from element 5 wear or from deformations in the belt 3 during operation. Such play is denoted the end play $E_P$ of the belt 3. The push trajectory part and the slack trajectory part may during operation, depending on the transmission conditions, be present at either the upper side, i.e. crossing trajectory $C_{TU}$ in FIGS. 7 and 8, or at the lower side, i.e. crossing trajectory $C_{TL}$ in FIGS. 7 and 8, of the transmission. In both crossing trajectories $C_{TU}$, $C_{TL}$ the carrier 4 serves, at least aids, to keep the elements 5 in a desired mutual orientation, and may thereby be subjected to high tensile forces. In practice the belt 3, in the push trajectory part shows a tendency to buckle due to the elements 5 pushing against each other, thereby virtually forming a metal rod between said pulleys 1 and 2 that has the tendency of splashing apart. Such tendency, however, is counteracted by the carrier 4 and in particular by a tensile force prevailing therein.

Figure 2:
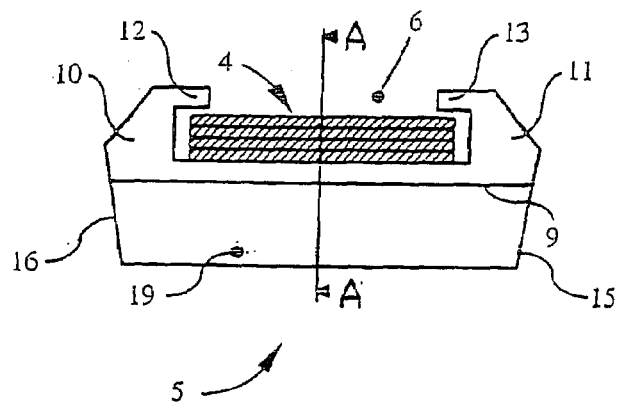
FIG. 2, on an enlarged scale, shows a front view of a prior art transverse element in a so called single package embodiment of a belt for the transmission means of FIG. 1.

In particular referring to FIGS. 2 and 3, an embodiment of a know prior art design of a transverse element 5 is schematically depicted, the description of which here serves to elucidate some basic functions and structural features of an element 5 for a belt 3, in particular a so called single package embodiment of the element 5 is depicted. Such type of element 5 has a central recess 6, alternatively denoted opening 6, for receiving a carrier 4 comprising a set of nested rings 7. The opening 6 is bounded in radially outward direction by the hook parts 12 and 13 of radially outwardly extending limbs 10 and 11. The limbs 10 and 11 each extend upwardly, i.e. radially outwardly, near a lateral side portion of the element 5, and define lateral boundaries of the recess 6. In this prior art embodiment the limbs 10 and 11 extend upwardly up to and slightly beyond the carrier 4 when it contacts the saddle surface 8 of the element 5. The hook parts 12 and 13 of the prior art limbs 10 and 11 are shaped to contain the carrier in the recess 6 once the belt 3 is assembled.

In the lower part thereof, the element 5 is provided with flanks 15 and 16, and with a tapering enabling the belt 3 to pass along the arc-shaped bent trajectory part $B_T$ in a pulley 1, 2. In the prior art embodiment, the rocking edge 9 is positioned somewhat below, i.e. radially inward from, the saddle surface 8. The tapering is realised by the inclined face 19 of the lower element part, which links up with a lower side of the rocking edge 9, being inclined downward, and rearward relative to a principal plane part extending above the axially oriented rocking edge 9. The lower element part is otherwise produced as a solid essentially trapezoid shaped block with relatively high stiffness that has an essentially straight lower edge that is oriented in the axial direction.

Figure 4:
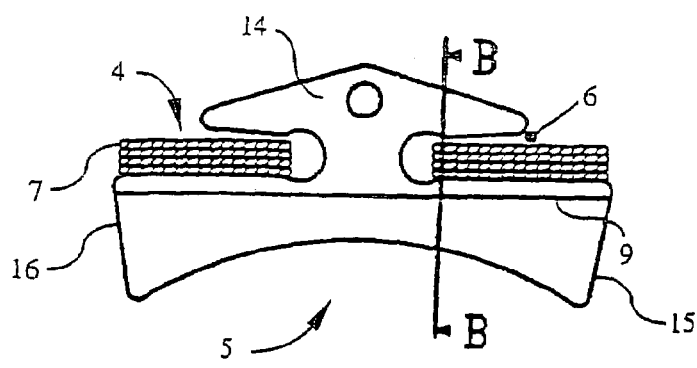
FIG. 4 is a front view of a so-called dual package element embodiment according to the invention.
Figure 5:
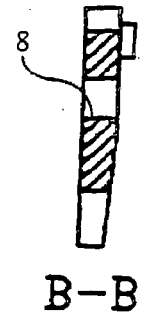
FIG. 5 depicts section B—B in FIG. 4.
Figure 7:
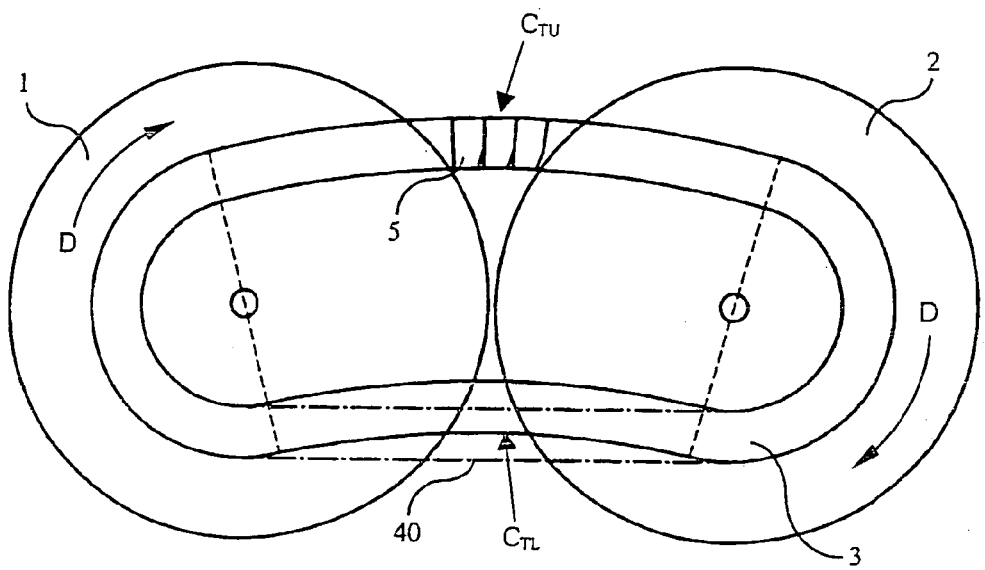
FIG. 7, in an elevation according to FIG. 1, schematically depicts the effect of an element design according to the invention.

FIGS. 4 and 5 depict an embodiment according to the invention which defines a belt 3 in particular adapted for application in a personal vehicle, containing the principal features of the embodiment according to FIGS. 2 and 3, but designed for receiving a carrier 4 in the form of two sets of rings 7, for which purpose two ring receiving recesses 6 in the form of slots 6 are provided. Each recess 6 is radially inwardly bounded by a saddle surface 8 and radially outwardly by a T-shaped upper element part 14 of the element 5. In the element 5 according to the invention, the upper element part 14, i.e. the part radially above the rocking edge 9, is slightly tapered such that it has a thickest part near its radial outer end. Preferably the thickness increases in radial outward direction by an amount of increment in the order of 4% of its thickness at or near the rocking edge 9, at least for a typical number of elements 5 in a single belt 3 between 300 and 500. A useful range in this respect, however, stretches between and includes the values of 1% and 20%. In this way at one crossing trajectory $C_{TU}$, $C_{TL}$ the typical "cat's back", i.e. a convex shape of the upper, i.e. pushing, crossing trajectory $C_{TU}$ depicted in FIG. 7 is favourably attained. According to the invention this shape promotes the contact between saddle surface 8 and carrier 4 in the upper crossing trajectory $C_{TU}$ and therewith also favourably promotes the centring of the elements 5 in this part of the trajectory. The convex shape also promotes the exit of the belt 3 from a pulley 1, 2.

FIG. 7, where D denotes a direction of rotation of the respective pulley 1, 2, further illustrates with that a pulley 1, 2, due to its exertion of a clamping force on the belt 3, tends to keep the elements 5 of the belt 3 clamped between its sheaves, i.e. to inhibit the said exit of the belt 3 by keeping the elements 5 moving in a circular trajectory. This feature is illustrated by the slack trajectory part, here the lower crossing trajectory $C_{TL}$, particularly in comparison with the theoretical straight trajectory indicated with reference number 40. The resulting tendency of the belt 3 to assume a concave shape depends on the total amount of play between the elements in the belt 3, i.e. the total end play $E_P$. Keeping this total end play $E_P$ within a strict limit as is the case in known belts 3, has a burdening effect on the manufacture of the belt 3. This may be reduced by the increased outer thickness feature, in that in the belt 3 according to the invention through the mutual contacting of the elements 5 tends to reduce the available amount of play between the elements 5. The structure according to the invention also allows a relatively large total end play $E_P$ within the produced belts 3, because the slightly increasing thickness of the elements 5 effects a reduction of available amount of play in the concavely shaped slack trajectory part too. Moreover, this reduction of play in the concavely shaped slack trajectory part simultaneously reduces the tendency of the belt 3 to buckle in such trajectory part. By this effect the belt 3 is more easily kept within an allowable amount of concave bending as defined according to the invention in relation to the imaginary spatial trajectory 40 of the belt 3 crossing entirely straight from a location of exit from one pulley 2 to a location of entrance at the other pulley 1. According to the insight underlying the present invention, it is defined that the concavely shaped slack trajectory part of belt 3 as seen in side elevation, should remain at least partly within the imaginary spatial trajectory 40, so as to avoid an extraordinary high force with the belt 3 and to realise that the carrier 4 stays within the recess 6. Although depicted in FIG. 7 with a small amount of buckling inward from the straight spatial trajectory 40, a belt 3 having the feature of the invention may easily be designed such that the concavely shaped slack trajectory part virtually coincides with the spatial straight trajectory 40.

Figure 6:
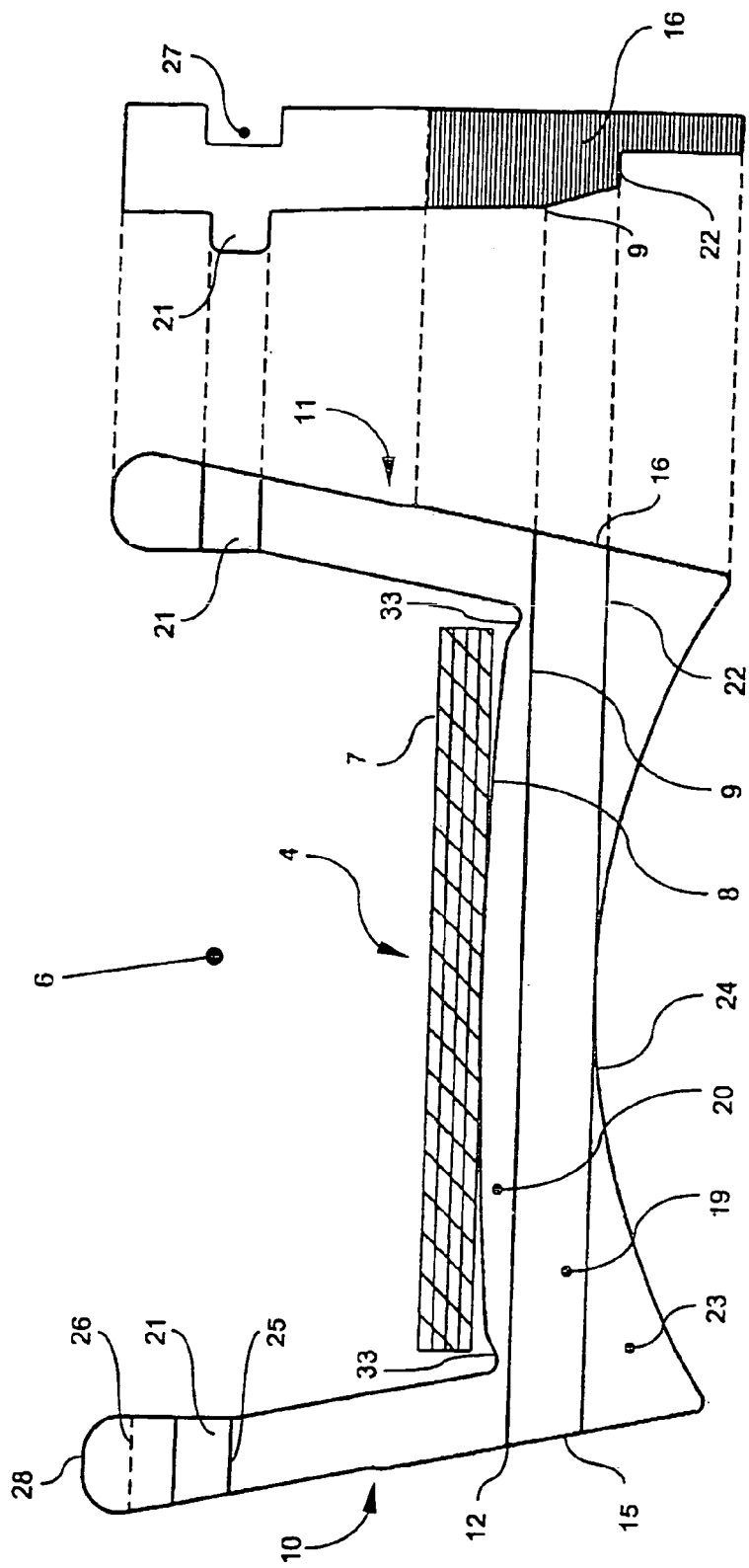
FIG. 6 is a front view of a single package element embodiment according to the invention and includes a side elevation connected to the front view by broken lines.

The above principle of thickening an upper element part may according to the invention favourably be applied in a single package embodiment as e.g. according to FIG. 2. In such design the feature according to the invention serves as a solution to the problem of attaining an economical and technically functional design, particularly since the feature also effects that the elements 5 in an upper crossing trajectory $C_{TL}$ are prevented from falling apart from each other or from the carrier 4, i.e. the integrity of the belt 3 is maintained. An example of such single package embodiment is provided in the structure depicted by FIG. 6. The side elevation part of FIG. 6 shows the preferred embodiment of the elements 5 in which the radial outward increasing thickness of an element is realised by the front face 20 of the upper element part being slightly inclined forward. Preferably, such front face 20 it located at the element's side where the rocking edge 9 and the inclined face 19 of the lower element part are provided, so that only one longitudinally facing side of the element is inclined, whereas the a further longitudinally facing face facing in the opposite direction as the front face 20 may be flat.

Figure 8:
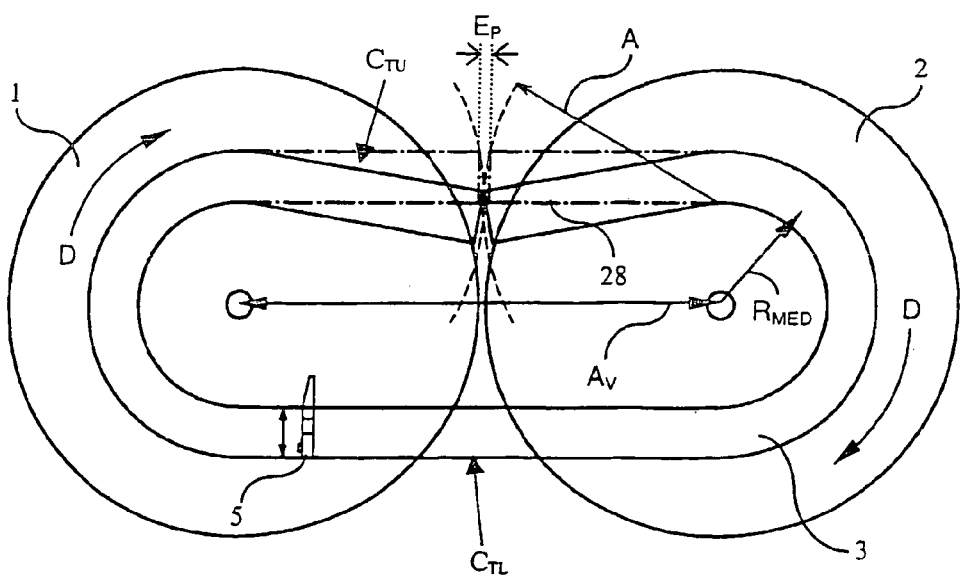
FIG. 8, in an elevation according to FIG. 1, schematically depicts the effect of an element design according to another aspect the invention when applied per se.

FIG. 8 elucidates the feature of a critical radial distance or height, whereby an insight in a belts geometrical features is favourably identified and applied in a new design, thereby utilising ordinary mathematical law. Differing from the representation in FIG. 7, in FIG. 8 the upper crossing trajectory $C_{TU}$ represents the slack trajectory part, where for taking into account the worst case the total end play $E_P$ is concentrated between two adjacent elements 5 that are located exactly halfway the slack trajectory part. Like in FIG. 7, the transmission is depicted with the belt 3 in Medium transmission condition, i.e. wherein a ratio of speed transfer and a ratio of torque transfer is 1. Arrow A originates at the upper side of the rocking edge 9 of an element 5 at the location of exit of the belt 3 from the relevant pulley 2. In Medium transmission condition the length of arrow A is approximately $½A_V$. Generally, it may be stated that an upper element part, which is relatively long, has the advantage that the risk of the belt to buckle, i.e. to collapse under its own tendency to bend towards its centre in the slack trajectory part, is strongly reduced. In connection with the feature explained according to FIG. 8, in fact use is according to the invention now made of an inherent possibility of the belt 3 for removing, or put alternatively compensating, correcting or absorbing, of an amount of end play $E_{PC}$. This possibility is recognised and made available by the present invention and set into effect by the measures in accordance with, at least derived from the following concept, which may be applied per se, either alternatively from the above described increased thickness solution or in addition thereto.

According to such alternative solution, the elements 5 are provided with relatively long extending limbs 10 and 11, as measured in the radial direction starting from the rocking edge 9 that are part of the upper element part. Preferably, but not necessarily this feature of the elements 5 is applied in combination with the above-described increasing thickness feature of the upper element part, as shown in FIG. 6. In the preferred embodiment according to FIG. 6, the limbs 10 and 11 extend above the rocking edge 9 up to a level beyond a critical radial distance, or height $H_{SE}$, considered part of the present invention. The critical radial height $H_{SE}$ above rocking edge 9 depends on a pre-defined desired amount of end play correction $E_{PC}$. The said end play correction $E_{PC}$ is only required to be a share of the total end play $E_P$ between the elements 5, when also the increased thickness solution is applied. As mentioned, such end play $E_P$, may be incorporated for facilitating manufacturing of the belt 3, may be due to elastic elongation of the carrier 4 and/or elastic compression of the elements 5 during operation, or may be due to wear of the belt 3 during operation. The invention with the said critical radial height $H_{SE}$ provides that at the concave bending of the slack trajectory part, radially outer parts of the limbs 10 and 11 remain within the imaginary spatial straight part 40, so that buckling is avoided and the carrier 4 is still located within the recess 6, thereby maintaining the structural coherence of the belt 3.

According to the invention this correction or removing of end play in the slack trajectory part is also realised by the first solution, wherein the element upper part is provided with an overall tapered shape, though be it to a lesser extend. In this respect an effective thickness of an element 5 may be defined as the smallest longitudinal distance between the front face 20 of two mutually contacting elements 5.

Because of the tapered shape of the upper element part, it is apparent that such effective thickness is the large when the elements 5 are mutually oriented in parallel, which occurs in the slack trajectory part in between the pulleys 1, 2, and small when they are oriented at an angle conforming to the taper of the upper element part, which occurs in the pushing trajectory part or in the free state circular shape of the belt 3, at least provided that the taper is relatively small, e.g. defined by an increase in thickness over the upper element part between 0.01 and 0.2 as defined by the invention. In the first case the effective thickness is equal to the largest thickness of the upper element part and in the latter case the effective thickness is equal to the largest thickness of the lower element part. Although such difference in effective thickness is small, i.e. between 0.01 and 0.20 according to the invention, it will be present for all pairs of adjacent the elements 5 present in the slack trajectory part. This effect causes a substantial amount of the total play between the elements 5 in the belt 3 that is present after assembly, i.e. when the belt 3 may assume a circular shape, to disappear during operation. This reduces the amount of play that is to be removed by the second solution when adopted simultaneously with the said first solution and accordingly reduces the critical distance $H_{SE}$.

It noted that, although essential for the functioning of the depicted single package embodiment, the solutions according to and the insights underlying the invention may as just as favourably be applied to a so called dual package embodiment as depicted in FIGS. 4 and 5. In this case, a definition of a T-shaped upper element part 14 defining the upper boundary of the recesses 6, may favourably become less strict, because the function of the said upper boundary in the state of the art elements 5 of maintaining the structural coherence of the carrier 4 and the elements 5 in the radial direction during operation is no longer required in the belt 3 according to the invention. This allows a reduction of the axial dimension of the T-shaped upper element part 14, where the transverse extensions of the T-shape may for instance serve only to facilitate belt 3 assembly.

It is further noted that both solutions according to the invention may be applied simultaneously so that each feature thereof, i.e. the said increased thickness and the said critical distance, need only be dimensioned for a pre-defined amount of end play correction $E_{PC}$ being a share of the total end play $E_P$ respectively. In this respect, it is further remarked, that the size and shape of the rocking edge 9, and in particular the radial distances between the said contact line and the saddle surface 8 in the two bent trajectories $B_T$ when compared with the free state shape, i.e. a circular shape of the belt 3 during manufacturing, is of influence on the total amount of end play $E_P$. Accordingly, the total amount of end play $E_P$ relevant for the above describe buckling may in practice be taken as the maximum amount of end play $E_P$ that may occur during operation of the drive belt 3 not having the said features of the invention.

Based on the above-described insights, the invention particularly relates to belts 3 designed according to the prescription of he following equation:

$$E_{PC} = 2 \cdot \sqrt{¼A_V^2 + H_{SE}^2} - A_V \quad (1)$$

Belts matching the criteria of equation 1 have the added advantage that the total end play $E_P$ may be chosen independently from a shape, a longitudinal protrusion and a location of an element's protrusion 21. Otherwise put, the current feature of the invention improves the design freedom at shaping and positioning an element's protrusion 21. In particular it need not be larger than the amount of longitudinal protrusion of circularly shaped protrusions 21 as taught by, and applied in commonly known belt types with a dual set of nested rings 7. The above criterion according to the invention may in particular be favourably applied for producing a belt 3 designed without means for limiting the radial outer movement of the carrier 4 relative to the transverse element 5, such as for instance the transverse extensions of the T-shaped upper element part 14.

According to the invention, the circumference length L of the belt 3 in practise proves to be a valuable and in automotive application sufficient indicator for the sometimes more preferred parameter indicating the centre distance $A_V$ between the shafts, i.e. the axial centres of the transmission's pulleys 1 and 2, as a result of a generally desired closest mutual orientation of pulley's. In the objective automotive applications of the belt, in particular for passenger vehicular movement application, the distance between the pulley's peripheries can be considered negligible in relation to the belt's actual circumference, i.e. generally being smaller than about 1%. In practice this means that the pulleys 1 and 2 are usually mutually positioned at the smallest radial distance possible. The end play removing ability of the height $H_{SE}$ according to equation (1) may the n be translated to a design requirement for the belt 3.

According to this insight, the circumference length L of a belt may be expressed as two times that centre distance $A_V$ plus the circumference length of both belt parts within the arc-shape bent trajectories $B_T$ with the pulleys, the latter trajectory parts being determined by the radius $R_{MED}$ of the belt 3 in Medium transmission condition, i.e. transmission ratio 1, and the constant π for calculating a peripheral circular length. In equation:

$$L = 2 \cdot A_V + 2 \cdot \pi \cdot R_{MED} \tag{2}$$

The radius at which the belt 3 runs in medium $R_{MED}$ is calculated as the halfway distance between the smallest and the largest running radius of the belt 3, $R_{MIN}$ and $R_{MAX}$ respectively:

$$R_{MED} = (R_{MIN} + R_{MAX})/2 \tag{3}$$

Considering a design rule for the objected application of the belt 3, the smallest running radius of the belt 3, which is determined by the radius a pulley shaft, is about 0.2 times the pulley diameter, the latter being approximately equal to the centre distance $A_V$. At least in automotive applications where the separation between the peripheries of the pulleys 1 and 2 may be neglected, $R_{MED}$ may be rewritten as:

$$R_{MED} = (0.2 \cdot A_V + 0.5 \cdot A_V)/2 = 0.35 \cdot A_V \tag{4}$$

For the objective application resulting in following equation (5) when applied in equation (2):

$$L = 2 \cdot A_V + 2 \cdot \pi \cdot 0.35 \cdot A_V = 4.2 \cdot A_V \tag{5}$$

Applied in equation (1) the minimally required height of the upper element part, i.e. the critical radial height $H_{SE}$ for a desired amount of end play correction $E_{PC}$ thus is in accordance with the present invention related to a belt's length L by the following expression whereby smaller terms of the equation are neglected:

$$H_{SE} \approx \sqrt{E_{PC} \cdot \frac{L}{8.4}} \tag{6}$$

For maximum security and safety, element play values are according to the invention safely set at 1.5 mm for elastic deformations and 2 mm for wear effects respectively, whereas the element play value in the assembled free state of the belt 3 is taken as 1.5 mm, to which for the present calculating purpose a safety margin is set of 0.5 mm. Thus a maximum amount for the total end play $E_P$ during operation would theoretically amount to 5.5 mm. In case the total end play $E_P$ is accounted for only by means of the upper element portion critical height $H_{SE}$ and in particular not by means of the effect of the increased thickness or the effect of the distance between rocking edge 9 and saddle 8 that are discussed in the above, equation (6) learns that the required height $H_{SE}$ would amount to 0.81 times the square root of the belt's length L. In practice however, such maximum amount of total end play $E_P$ is seldom reached, most of the time a lower element play value may occur at assembly of the belt 3, while belt wear is not that excessive since a belt 3 is hardly run at infinite life time defined at over 250.000 kilometers. Further, according to the insight underlying the invention, the maximum tension is not always reached in a transmission, while also the theoretical element play measured at assembly, i.e. with the elements 5 stacked against one another over the carrier 4 such that the play is concentrated between two adjacent elements 5, is usually larger than the element play that occurs during operation when the total element play is more or less distributed between a number of pairs of adjacent elements 5. Thus in practice a much lower end play correction $E_{PC}$ amount will generally suffice than what may be expected on the basis of the theoretical maximum. However, the total end play $E_P$ is preferably taken larger than an initial element play in the belt 3 in its circular free state shape.

According to the invention, from equation (5) may it may concluded that the critical height $H_{SE}$ of the upper element part should satisfy a condition set by a factor C times the square root of the circumference length L of the belt (3), wherein C is of a value equal to or larger than 0.35 times the square root of the amount of end play ($E_{PC}$) to be removed.

In a further useful work-out, the current insight is developed as a design rule according to which the critical height $H_{SE}$ of the element 5 extending above the rocking edge 9, for attaining the effect presented by the present invention, should be set between at least 9.5 and at most 21 mm. Or still more accurately, that height $H_{SE}$ should be set between 10 mm and ending at 5 mm for belts having a circumference length L in the range starting at 350 mm and ending at 850 mm.

In yet a further useful workout, the amount of end play $E_{PC}$ to be removed is about the initial longitudinal play between the elements 5 when the belt 3 is positioned in a circular, or free state shape. According to the invention, a suitable range for the factor C in this case starts at 0.35 times 1.1 times the square root of the initial longitudinal play and ends at 0.35 times 3 times that value. This range is chosen such that it starts by including a safety factor of 0.1 to account for minor effects on the said play, such as e.g. vibrations in the belt 3, and that it ends at a value taking account of considerable elastic deformations within the belt and the most severe wear that is to be expected under normal operating conditions.

In still a further useful workout, the said amount of end play $E_{PC}$ to be removed is about the initial longitudinal play between the elements 5 when the belt 3 is positioned in a circular, or free state shape reduced by the amount of play that is removed in the slack trajectory part by the feature of the upper element parts having a tapered shape, as well as by the amount of play that is removed when the belt is deformed from its circular free state shape into its transmission configuration of bent and straight trajectories by the influence the shape and location of the rocking edge 9 has on the end play. Since the LOW transmission condition usually represent the condition wherein the belt 3 is the most highly loaded during operation, the invention prefers that the amounts of play to be subtracted from the initial play are determined for this transmission condition. Surprisingly, this is in contrast with the notion that both amounts of play to be subtracted are actually smallest in Medium transmission condition. However, according to the invention, the elastic deformation of the belt increasing the element play during operation is by far the largest in LOW condition and substantially surpasses the influence of the transmission condition on both amounts of play to be subtracted from the initial play.

Moreover, in case the element 5 is provided with a longitudinally extending protrusion 21 that is at least predominantly provided in the upper element part the initial longitudinal play between the elements 5 when the belt 3 is positioned in a circular, or free state shape is preferably in a range between 1 and 2 times a longitudinal amount of protrusion N1, N2 of the protrusion 21.

For ease of assembly said initial longitudinal play between the elements 5 when the belt 3 is positioned in a circular, or free state shape is at least three quarters of a largest thickness of the elements 5.

Both solutions for maintaining the integrity of the belt 3 during operation respectively described in relation to FIGS. 7 and 8, obviate the use of known locking means provided as a integral part of the element 5 for keeping together the elements 5 and the carrier 4. Such known locking means have the drawback that they might collapse when loaded during operation, which are usually difficult to manufacture and that they restrict the freedom of design of an element 5. In combination the solutions according to the invention have the advantage that the magnitude of the thickness increase of the upper element part and the magnitude of the height of the limbs 10 and 11 may be traded off against one another, thus creating a freedom of design, positively effecting the functionality and manufacturing costs of the belt 3.

Figure 9:
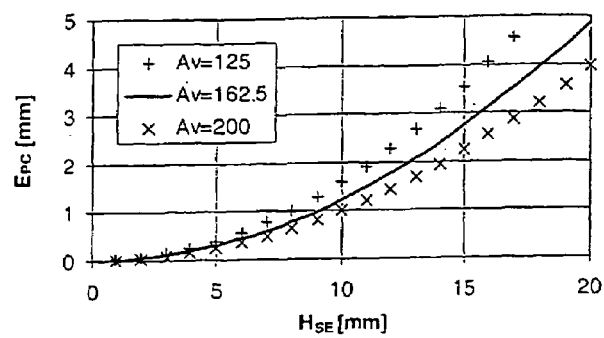
FIG. 9 is a schematic plot for several distances ($A_V$) between pulley axial centres of an end play correction ($E_{PC}$) effect against an element's critical height ($H_{SE}$) according to the invention.

FIG. 9 figuratively illustrates the relation provided by equation 1, by way of an example plot of the amount of end play correction $E_{PC}$ within the defined criterion for the distance between the rocking edge 9 and a radial outer boundary of an element 5, the critical height $H_{SE}$. Several relations the rein relate to commonly applied pulley diameters, i.e. centre distances between pulley axial centres $A_V$, and are especially suitable for automotive application. For example, for a typical belt 3 a relatively large amount of say 1.2 mm of the total end play $E_P$ may be corrected, or put alternatively removed, by the critical radial height $H_{SE}$ of 10 mm that the limbs 10 and 11 extend above the rocking edge 9.

Figure 10:
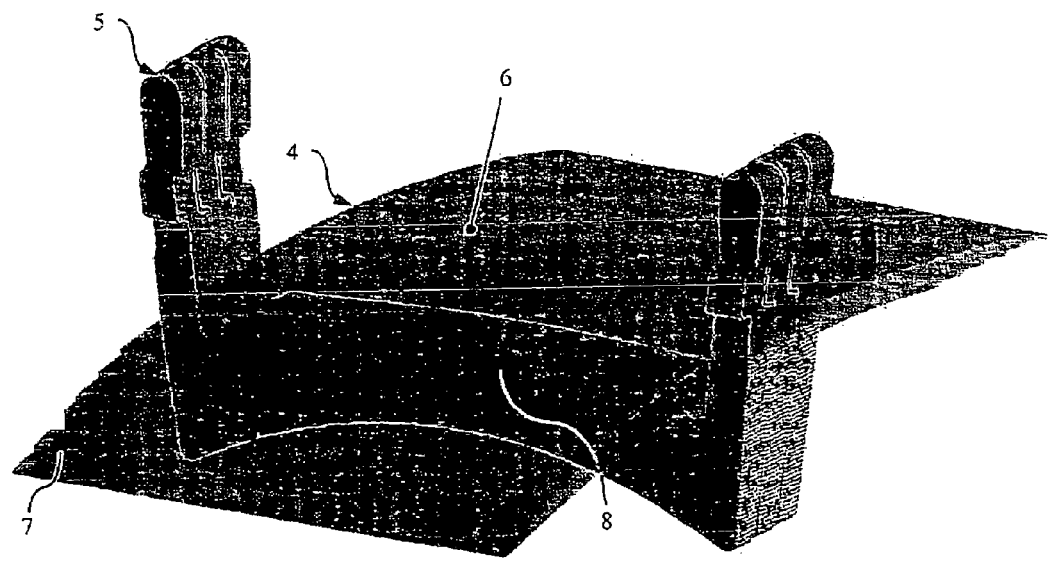
FIG. 10 is a perspective view of a belt part incorporating the element according to FIG. 6.

FIG. 6 and its perspective representation in the belt section of FIG. 10 depict an embodiment according to the invention showing several further independent aspects of the current invention.

First of all, it is noted that the single package design with its limbs 10, 11 forming an axial boundary for a transverse movement of the carrier 4 differs from the double package design where transverse movement of the carrier 4 to one side is not bound by the element 5, but by the pulleys 1, 2. This difference allows the elements 5 of the double package design to be positioned such between the sheaves of a pulley 1 or 2 that the carrier 4 is located at least partly radially outward from the pulley 1, 2, while the flanks 15 and 16 are still partly located between the sheaves of the pulley. Consequently, with the same pulley design, a range of transmission ratios—a transmission ratio being the quotient of the running radii of the bent trajectory parts $B_T$ in the pulleys 1 and 2—that can be realised with a belt 3 of given length L may be larger with the single package belt design than with the double package design. This is considered highly desirable, since in the same building space the functionality of the transmission is improved. Underlying this feature of the single package belt 3 is the insight that, although in the condition where the carrier 4 is located radially outside the pulley 1, 2, also the flanks 15 and 16 are partly located radially outside the pulley 1, 2 thereby increasing the pressure thereon, this may according to the invention be allowed because it only occurs at the bent trajectory part $B_T$ having the largest running radius where the number of elements 5 between the sheaves of the pulley 1, 2 and thus also the total surface area available for taking up the forces is relatively large anyway.

The elements 5 according to the invention are shown to be relatively thin, i.e. between 1.5 mm and 3.0 mm, and to have a lower element part with a inclined face 19 extending between the rocking edge 9 and a inner edge 24 of the element as seen in the radial direction of the belt 3. The thickness of the lower element part as seen in side elevation declines towards its inner edge 24, so as to allow the belt 3 to be bent when passing a arc-like bent trajectory $B_T$ in the pulleys 1 and 2. Due to an operational tension within the radially stacked set of rings 7, the carrier 4, and at least the part thereof passing a bent trajectory $B_T$, is depicted and considered to be forced in contact with the saddle surface 8 of the element 5. The inner edge 24 is curved concave such that a minimal radial height of the lower element part is attained near the centre of the element 5 as viewed in the axial direction of the belt 3. The inclined face 19 may continue towards and merge with the inner edge 24, however, in a favourable light weight embodiment of the element 5, the inclined face 19 adjoins a recessed part 23 through a step 22 in the longitudinal direction of the belt 3. In FIG. 6 the depth of the step 22 has been exaggerated for clearly showing the details thereof. In fact the step 22 has a depth dimension ranging between $1/12$ and $3/12$ of the thickness of the element 5 just above the rocking edge 9. In a preferred embodiment of the element not depicted here, the step 22 virtually adjoins the rocking edge 9 in which case inclined face 19 is absent. In this manner, especially when the recess part 23 is realised in a manufacturing step or process preceding that of shaping the rocking edge 9, the element 5 may be produced more accurately, because less effort is needed in blanking the element 5 from a plate or strip, due to the reduced surface area of the cutting edges. A functional reason for providing the step 22 is to allow the flanks 15 and 16 to be of considerable height, i.e. length in the radial direction of the belt 3, for optimum contact with a pulley 1, 2, while still fulfilling the requirement of low weight of the element 5. For assuring adequate contact, the depth of the step 22 should not exceed ½ of the thickness of the element 5 just above the rocking edge 9. The inner edge 24 at the location where it is closest to the saddle 8 is designed to join, or at least end close to the step 22, possibly even intersecting it. Preferable the inner edge 24 intersects the step 22 in a single point as shown in FIG. 6. The inner edge 24 may be shaped as a concave curvature starting and ending respectively in the immediate vicinity of a radially innermost element portion, e.g. such that it virtually merges with the flanks 15 and 16 by a rounding of small radius, e.g. of 0.3 mm. It may be allowed that such concave curvature is interrupted by the step 22 intersecting it, but the depth of the curvature in the radial direction should preferably at least extend up to ⅙ the width of the element 5 in the axial direction of the belt 3 just above the rocking edge 9. Preferably, the concave curvature is arc shaped or is composed of several adjoining arcs as the case may, such arc or arcs having a radius of curvature within a range between 0.5 and 1 of the width of the said lower element part. In this manner, forces acting on lower parts of the contact faces 15 and 16 are favourably transferred to the element 5.

In an embodiment according to the invention the element 5 is further provided with at least one protrusion 21 protruding longitudinally from the front face 20. The protrusion 21 is provided in the radially outer half of the front face 20. At the further longitudinally facing face of the element 5 longitudinal opposite to the front face 20, such protrusion 21 goes along with a hole 27, i.e. a recessed element part that is shaped more or less conforming to the protrusion 21. In the embodiments shown, protrusions 21 are provided in each of the limbs 10 and 11 and are shaped more or less rectangular extending in a predominantly axially oriented direction. Preferably, the largest dimension of the protrusions 21 in the radial direction substantially corresponds to the thickness of the element 5 just above the rocking edge 9. In a preferred embodiment, an axially facing side face of the limbs 10 and 11 predominantly extends substantially parallel to the flanks 15 and 16, thereby facilitating both operational stability of the belt 3 and the assembly thereof. The protrusions 21, alternatively denoted longitudinal projections 21, in the current design serve as a backup safety for preventing the elements 5 to separate from the carrier 4 when in the slack trajectory part or when the belt 3 should somehow not be tensioned in the absence of the clamping force. However, a basic clamping force is usually provided by means of a spring acting on the movable sheave of at least one of the pulley 1 or 2. For this reason, preferably the initial element play after assembly of the current belt design is set at twice the longitudinal protruding length of a protrusion part 21.

Figure 11:
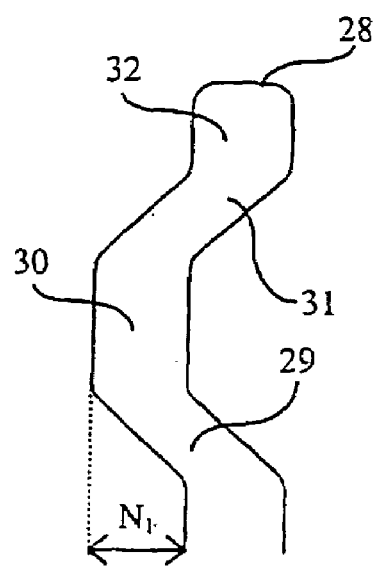
FIG. 11 is an upper portion of an alternative element embodiment, represented in a view according to the side elevation in FIG. 6.
Figure 12:
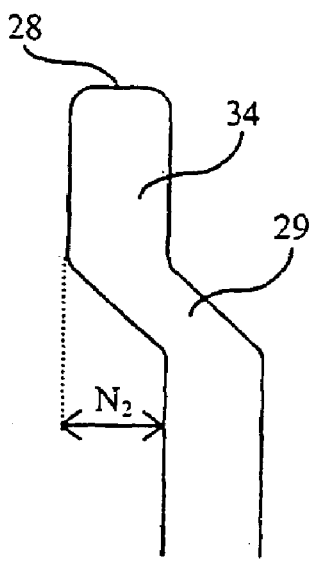
FIG. 12 is an upper portion of a second alternative element embodiment, represented in a view according to the side elevation in FIG. 6.

In a preferred embodiment of the invention the protrusions 21 are shaped in accordance with one of the FIGS. 11 and 12. FIGS. 11 and 12 each represent an upper section of the side elevation of FIG. 6. Rather than being shaped by blanking, the protrusions 21 may favourably be produced by bending of the limbs 10 and 11. This has the advantage that the longitudinal thickness and therewith the strength of a limb 10, 11 may be maintained throughout its radial height. In the embodiment according to FIG. 11, the protrusion 21 is embodied by three limb parts 29, 30 and 31 of conforming if not equal thickness. The amount of longitudinal protrusion $N_1$ may by this design be considerably increased with regard to the protrusion 21 intended to interact with hole 27. In the embodiment of FIG. 11 the radial dimension of the limb parts 29, 30 and 31 is limited by the length of a limb 10, 11, but on the other hand may be as thick as the limb 10, 11, which is considerably thicker than the protrusion 21 intended to interact with hole 27 of the side elevation of FIG. 6. In the embodiment of FIG. 12 the amount of longitudinal protrusion of the limb parts 29 and 34 matches the local thickness of the element 5. According to the invention, however, the amount of longitudinal protrusion may be in principle being made as large as twice the thickness of the element 5 at the location of limb part 29. In the design according to FIG. 12 the amount of protrusion $N_2$ may favourably be made larger than $N_1$ because the limb part 31 folded rearward that uses some of the available radial length of a limb 10, 11 is omitted. In both designs the limb part 29 comprises axially and longitudinally upward extending surfaces that face either to the front or to the back of the element 5. By the front of the element is meant the side of the element 5 where the rocking edge 9 is located. Another advantage of the embodiment of FIG. 12 is that the radially outer limb part 34 may be produced relatively long more easily.

The relative large amounts of longitudinal protrusion $N_1$ and $N_2$ of the limb parts 29, 30, 31 and 29, 34 positively influence both the maintenance of the integrity, or coherence of the belt 3 while in operation and the capability and easy of the belt of exiting a pulley 1, 2. Preferably the limb parts 29 and 31 extend under an angle larger than or conforming to 45 degrees, more preferably within a range between 50 and 60 degrees relative to the longitudinal direction of the belt 3.

In the embodiment according to the invention the flanks 15 and 16 extend from near the radially innermost part of the element to well above the saddle surface 8 and preferably up to, or even beyond the carrier 4 at least when contacting the saddle surface 8. Preferably the flanks 15 and 16 extend for at least one third more preferably for at least half of their radial length above the rocking edge 9. In a specific embodiment according to the invention, the flanks 15 ad 16 extend for one fifth of their entire radial length above the carrier 4. The entire radial length of the flanks 15 and 16 conforms to at least approximately half of the radial height of the element 5. In this way it may be achieved that a moment realised by forces acting on the element 5 in a bent trajectory $B_T$, as for instance described in mentioned in JP 2000/213609, is reduced to a level too small to effect tilting of the element 5 about an axial of the belt 3. In particular, an effective force resulting from friction between a pulley 1, 2 and the element 5, a relatively less intense friction force between the saddle surface 8 and the carrier 4 and a pushing force exerted through the rocking edge 9 between adjacent elements 5 influence the said moment. Such tilting is accompanied by slip between the element 5 and the pulley 1, 2, thereby adversely affecting the efficiency of the transmission. The tendency of the element 5 to tilt about an axial of the belt 3 so that it is no longer oriented substantially radially while being clamped in a pulley 1, 2, is significantly reduced by the current measure according to the invention. Therewith the efficiency with which torque is transmitted by the belt 3 is advantageously increased, without the need for the rocking edge 9 being located at a considerable radial distance from the saddle surface 8, which would be required for the known element designs of FIGS. 2 to 5 and which would adversely effect the functioning of the belt 3 by increasing the relative speed between carrier 4 and elements 5 as for instance described in JP 01/098733.

The design of the flanks 15, 16 according to the invention further effects that its radial length is advantageously increased, which is in particular advantageous in a belt part that is most tightly bent during operation, usually being the arc-like bent trajectory having smallest running radius (corresponding to $R_{MIN}$) when the belt 3 is in a state conforming to the so called Low transmission condition. In this condition and location, usually the said friction forces and the clamping force are the largest during operation, whereas the number of elements 5 in the pulley 1, 2 available for taking up such forces is smallest. Moreover, the arc-like shaped inner edge 24 allows the flanks 15 and 16 to be of considerable radial length and to stretch considerably below the level of the rocking edge 9, while the said forces are favourably taken up by and distributed over the bulk of the element 5. The total length of a flank 15, 16 is at least twice, but preferably at most five times, the height of the smallest radial dimension of the element 5 between the saddle surface 8 and the inner edge 24. Such range provides for optimal receiving of the pinching force, while still providing sufficient strength to the element 5.

The relatively large radial length of the flanks 15 and 16 further effects a reduced contact pressure in the contact between element 5 and pulley 1, 2 at an otherwise constant clamping force. Although the stress associated with such contact pressure, usually denoted as Hertzian contact stress, is generally not considered critical for mechanical strength of either the element 5 or the pulley 1, 2, as may be taken from the given material characteristics and theoretical analysis, indeed the pressures prevailing in the said contact effects the performance of many types of hydraulic fluid. In particular, local disintegration of a cooling and/or greasing medium may be prevented when the amount of locally dissipated heat is kept low, or, alternatively put, when the contact pressure is kept low, i.e. is reduced compared to what is known from the prior art. The maintaining of low Hertzian contact stress in the contact between pulley 1, 2 and element 5 is according to the invention of high practical importance, because the disintegration of the cooling medium may quickly be followed by loss of functionality of the transmission.

FIG. 6 further shows the limbs 10 and 11 having end parts where their axial width slightly increases in radial outward direction. The end parts are provided with a radial top side that is formed by an at least partly curved plane 28 extending from one axial limb side to the opposite axial limb side and starting at the widest section 26 of the limb 10. The curved plane 28 is preferably at least partly curved with a radius of curvature in the order of half of the longitudinal thickness of the element 5 at the location of the rocking edge 9. The preferred embodiment further shows a central, flat plane part extending axially and longitudinally. The increasing axial width of the limbs 10 and 11 at the location of their end parts allows a stable mutual support of the elements 5, while the belt 3 passes the inwardly curved slack trajectory part. Such widening is preferably attained with the axial inner side of a limb 10, 11, i.e. the side that faces the recess 6, extending radially, i.e. at least virtually perpendicular to the axial and longitudinal directions of the belt 3. Alternatively, e.g. when the axial outer side of the end part of the limb 10, 11 facing the pulley 1, 2 predominantly extends radially as indicated in FIG. 13, the said widening may be attained with a part of the axial inner side being oriented away form the axial outer side.

Figure 13:
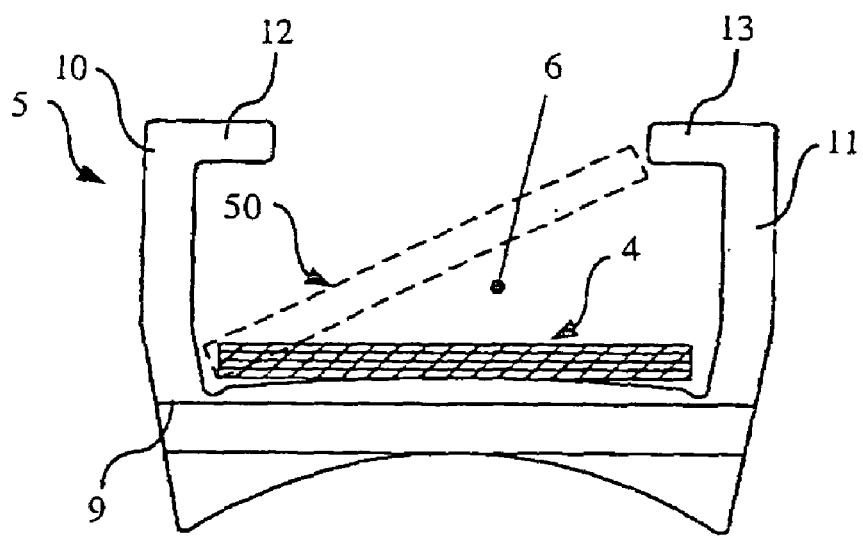
FIG. 13 is a schematic illustration of an element embodiment falling within the scope of the present invention.

FIG. 13 schematically illustrates an embodiment of the element 5. Square 50 indicates how the carrier 4 may be received by the recess 6 of the element 5 at assembly of the belt 3 without. In contrast with the state or the art element design as shown in FIG. 2, the hook shaped end parts 12 and 13 of the limbs 10 and 11 do not serve, or in fact because of their limited size cannot serve, to lock the carrier 4 and element 5 together during operation, but to increase a surface area available for contact between adjacent elements 5 and to aid in maintaining the belt's 3 coherence when it is not operation. With this it meant that, although the hook parts 12 and 13 are not large enough to effectively lock the carrier 4 in the recess 6, as is the case in the state of art element 5, they do inhibit the carrier 4 from leaving the recess 6 when oriented substantially parallel to the axial direction.

With the respective design features according to the invention described in the preceding, taken per se or in combination, the reduction of an elements weight is realised and/or supported, which reduction favours the torque transmitting capacity of the belt 3 during operation in a transmission, positively effecting its cost price and/or technical performance. The invention is not limited to the matter according to the following claims but includes all features as disclosed by the drawings and the description pertaining thereto.

The invention claimed is:

1. Belt (3) for use in a continuous variable transmission, comprising an endless carrier (4) for taking up tensile forces within said belt (3), and a plurality of transverse elements (5) provided moveable in the longitudinal direction along said carrier (4), which elements (5) are provided with at least one saddle surface (8) for contacting the carrier (4), which saddle surface (8) defines an ultimate mutual position of the said carrier (4) and the said elements (5) relative to each other within the belt (3) in radial direction, and with a tapered lower element part including a rocking edge (9), whereby each axial end of the saddle surface (8) is adjoined by a limb (10; 11) in the form of a protrusion extending predominantly in radial outward direction, thereby defining a recess (6) open to the radial outer end of the element (5) allowing free insertion of the carrier (4) in the recess, whereby each limb extends radially outward beyond the carrier (4) over a distance that substantially conforms or exceeds an longitudinal thickness of the element (5) at the location of the saddle surface (8), at least when the carrier (4) and the saddle surface (8) are in mutual contact, and whereby the transverse elements (5) are further provided with a pulley contact face (15, 16) at each axial side thereof for contacting a pulley sheave of the transmission, which pulley contact faces (15, 16) are mutually oriented under a flank angle and which pulley contact faces (15, 16) extend radially outward beyond the carrier (4), at least when the carrier (4) and the saddle surface (8) are in mutual contact, characterised in that the limbs (10, 11) each have an axial side face that extends in a predominantly radial direction under a small, but positive angle with such radial direction substantially conforming to the flank angle, said axial side face extending radially outward beyond the pulley contact faces (15, 16).

2. Belt (3) according to claim 1, characterised in that an axial width of each limb (10, 11), at least of a radially inner most part thereof, is less than one twelfth of an axial width of the element (5) at the rocking edge (9).

3. Belt (3) according to claim 2, characterised in that an axial width of each limb (10, 11), at least of a radially innermost part thereof, has a value in the ranges from 1 to 1.5 times the said longitudinal thickness of the element (5).

4. Belt (3) according to claim 1, characterised in that an axial width of each limb (10, 11), at least of a radially innermost part thereof, has a value in the ranges from 1 to 1.5 times the said longitudinal thickness of the element (5).

5. Belt (3) according to claim 1, characterised in that, each pulley contact face (15, 16) extends for at least one third of its radial height beyond the rocking edge (9).

6. Belt (3) according to claim 1, characterised in that, each pulley contact face (15, 16) extends over at least approximately half of the radial dimension of the element (5).

7. Belt (3) according to claim 1 characterised in that the limbs (10, 11) comprise a radially outer part having an axial width that is increased relative to an axial width of a radially innermost part of the respective limb (10; 11).

8. Belt (3) according to claim 7, characterised in that the said radially outer part of each limb (10; 11) having an increased axial width has a side face facing the recess (6) that extends predominantly in the radial direction.

9. Belt (3) according to claim 8, characterised in that the radially outer part of the limbs (10, 11) extends axially, thereby partly overlapping the saddle surface (8).

10. Belt (3) according to claim 7, characterised in that the radially outer part of the limbs (10, 11) extends axially, thereby partly overlapping the saddle surface (8).

11. Belt (3) according to claim 1, characterised in that each limb (10; 11) is provided with notch-like longitudinal protrusion (21) provided radially outward beyond the carrier (4), at least when the carrier (4) and the saddle surface (8) are in mutual contact.

12. Belt (3) according to claim 11, characterised in that, the limbs (10; 11) comprise a radially outer part having an axial width that is increased relative to an axial width of a radially innermost part of the respective limb (10; 11), which is at least partly located radially outward beyond the notch-like longitudinal protrusion (21).

13. Belt (3) according to claim 1, characterised in that a critical radial height $H_{se}$ of the limbs (10, 11) is set in relation to a circumference length L of the belt (3) to minimize an amount of play ($E_{pc}$) present between the transverse elements (5), at least when mounted and run in a transmission by mutual contact between the limbs (10, 11) of at least two transverse elements (5) in a concavely shaped slack trajectory part of the belt (3) in between the pulleys (1, 2).

14. Belt (3) according to claim 1, characterised in that, a thickness of the limbs (10, 11) of a majority of the transverse elements (5) in the longitudinal direction of the belt (3) is notionally larger than a largest thickness of the tapered lower element part, such that an array of elements (5) being pushed against one another within said belt (3) when mutually contacting through their upper element parts (10, 11; 14) assumes an arc-like shape.

15. Belt (3) according to claim 1, characterised in that, the rocking edge (9) is formed by an axially extending convex curvature having a radius of at least 12 mm when measured in side elevation.

16. Belt (3) according to claim 1, characterised in that, the rocking edge (9) is formed by an axially extending convex curvature having a radius larger than 18 mm when measured in side elevation.

17. Belt (3) according to claim 1, wherein each limb (10, 11) has a terminal end portion including the axial side face that extends in the predominantly radial direction so that an entirety of the limb extends in the predominantly radial direction substantially conforming to the flank angle of the corresponding pulley contact face an parallel to an axial side of the corresponding pulley contact face.

18. Belt (3) according to claim 1, wherein,
each pulley contact face (15, 16) extends for about half of its radial height beyond the rocking edge (9), and
a minimum width of said recess exceeds a maximum width of said carrier including any retainers associated therewith.

19. Belt (3) for use in a continuous variable transmission, comprising:
an endless carrier (4) for taking up tensile forces within said belt (3); and
a plurality of transverse elements (5) provided moveable in a longitudinal direction along said carrier (4),
said elements (5) provided with at least one saddle surface (8) contacting the carrier (4),
said saddle surface (8) defending an ultimate mutual position of the said carrier (4) and the said elements (5) relative to each other within the belt (3) in a radial direction,
said saddle surface (8) having a tapered lower element part including a rocking edge (9),
a limb (10; 11) adjoining each axial end of the saddle surface (8),
each limb in the form of a protrusion extending predominantly in radial outward direction and defining a recess (6) open to a radial outer end of the element (5),
the recess allowing free insertion of the carrier (4) in the recess without deformation of the carrier during the insertion,
each limb extending radially beyond the carrier (4) over a distance substantially conforming or exceeding a longitudinal thickness of the element (5) at the location of the saddle surface (8), at least when the carrier (40 and the saddle surface (8) are in mutual contact,
each limb (10, 11) having a terminal end portion with an axial side face that extends in a predominantly radial direction under a small, but positive angle with the radial direction substantially conforming to a flank angle of a corresponding pulley contact face and parallel to an axial side edge of the corresponding pulley contact face,
said axial side face extending radially outward beyond the pulley contact faces (15, 16), and
said elements further provided with a pulley contact face (15, 16) at each axial side thereof for contacting a pulley sheave of the transmission,
the pulley contact faces (15, 16) mutually oriented under the flank angle and extending radially outward beyond the carrier (4), at least when the carrier (4) and the saddle surface (8) are in mutual contact.

20. Belt (3) for use in a continuous variable transmission, comprising:
an endless carrier (4), in operation, taking up tensile forces within said belt (3); and
a plurality of transverse elements (5) provided moveable in a longitudinal direction along said carrier (4),
said elements (5) provided with at least one saddle surface (8) contacting the carrier (4) and defining an ultimate mutual position of the said carrier (4) and the said elements (5) relative to each other within the belt (3) in a radial derection,
said saddle surface (8) having tapered lower element part including a rocking edge (9),
a limb (10; 11) adjoining each axial end of the saddle surface (8) and extending predominantly in radial outer end of the element (5),
a minimum width between endpoints of corresponding limbs exceeding a width of the carrier,
the recess allowing free insertion of the carrier (4) in the recess without deformation of the carrier during the insertion,
each limb extending radially beyond the carrier (4) over a distance substantially conforming or exceeding a longitudinal thickness of the element (5) at the location of the saddle surface (8), at least when the carrier (4) and the saddle surface (8) are in mutual contact,
each limb (10, 11) having a terminal end portion with an axial side face that extends in a predominantly radial direction substantially conforming to the flank angle so that an entirety of the limb extends in the predominantly radial direction substantially conforming to a flank angle of a corresponding pulley contact face and parallel to an axial side edge of the corresponding pulley contact face, said axial side face extending radially outward beyond the pulley contact faces (15, 16), and said elements (5) further provided with a pulley contact face (15, 16) at each axial side thereof for contacting a pulley sheave of the transmission, the pulley contact faces (15, 16) mutually oriented under the flank angle and extending radially outward beyond the carrier (4), at least when the carrier (4) and the saddle surface (8) are in mutual contact, so that a radial height of the pulley contact faces is greater than a radial height of the carrier.

\* \* \* \* \*